3,317,636
O,O,O',O'-TETRAMETHYL O,O'-THIODI-p-
PHENYLENE PHOSPHOROTHIOATE
James Byron Lovell, Pennington, N.J., and Ronald William Baer, Flushing, N.Y., assignors to American Cyanamid Company, Stamford, Conn., a corporation of Maine
No Drawing. Filed Jan. 10, 1964, Ser. No. 336,876
1 Claim. (Cl. 260—929)

This invention relates to O,O,O',O'-tetramethyl O,O'-thiodi-p-phenylene phosphorothioate, its preparation, insecticidal compositions containing said compound, and its use as a pesticide and in particular as an insecticide for larvae as well as for adults.

Sulfur containing diphenylene organophosphate esters of the formula

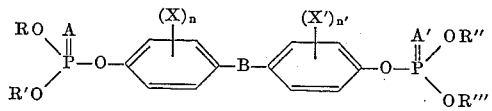

wherein A and A' are sulfur or oxygen and may be the same or different; B is S, SO or $SO_2$; X and X' are halogen such as chlorine or bromine or lower alkyl, i.e., methyl, ethyl, propyl, isopropyl or butyl, and may be the same or different; $n$ and $n'$ are from 0 to 2 and may be the same or different; and R, R', R" and R'" are lower alkyl and may be the same or different, as a new class of novel insecticides are described in our copending application Ser. No. 287,190, filed on June 12, 1963, now abandoned, of which application the present is a continuation in part.

While these compounds as a class have demonstrated useful pestidical and in particular insecticidal properties, the present invention is directed to a species falling within the above-defined genus which, when considering its pesticidal and in particular insecticidal and larvicidal activity, as well as its low toxicity to warm blooded animals, renders it an outstanding compound among the numerous compounds contemplated by the above general formula.

The compound O,O,O',O'-tetramethyl O,O'-thiodi-p-phenylenephosphorothioate may be prepared by reacting the diphenol:

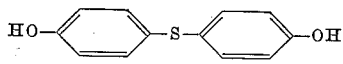

with at least 2 moles of O,O-dimethylphosphorohalidothioate represented by the formula

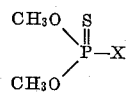

wherein X is halogen and preferably chlorine.

The reaction between the diphenol and the O,O-dimethylphosphorohalidothioate is carried out on a relative mole basis of one mole of the diphenol to at least 2 moles of the phosphorohalidothioate, although up to 4 moles of the phosphorohalidothioate may be employed to advantage under alkaline conditions and in the presence of a polar solvent such as water, methyl ethyl ketone and the like, at a temperature of from between 0 and 100° C. This compound may also be prepared in solvents having a wide range of polarity employing a variety of methods to prevent the accumulation of hydrogen halide by-product.

In preparing the diphenylene organophosphate of this invention, we have discovered that solvent systems do exert a substantial influence on the yield and "as is" purity of the product. In this connection, we have determined that employing an aqueous alkaline reaction medium (in lieu of an organic solvent medium such as methyl ethyl ketone) having a pH of greater than 9 and normally of from about 9.5 to about 12 at a temperature of from 20° C. to about 80° C. (normally from 25° C. to 60° C.) results in at least a 70% yield, though usually the yield is higher. As important as yield, however, is that the product has a high "as is" purity. This is most important because the compound, being of high molecular weight and generally liquid character, cannot be conveniently purified. Further, of course, the use of water as the solvent eliminates the added cost of manufacture which results when use and recovery of organic solvents is necessary.

While the compound of this invention may be adapted for various uses, including use as a petroleum additive, its outstanding utility appears as an insecticide for larvae as well as adults. In addition to insect larvae, it is highly effective against chewing insects, whether they be in the larvae or adult stage.

As an insecticide, it may be applied as a dust, spray, emulsion, wettable powder and the like. As a spray, it may be employed in organic solvents, such as various ketones, e.g., acetone, cyclohexanone, isophorone and the like. Additionally, as a spray it may be employed with lower monohydric aliphatic alcohols, ketone alcohols such as diacetone alcohol, and in various esters and aromatic hydrocarbons. It may be employed as an emulsion in water or other non-solvents to which suitable surfactants, wetting agents or emulsifying agents have been added. It may be applied on solid carriers, such as talcs and clays, as for example kaolin clay or fuller's earth, or on such carriers as chalk, wood flour, silica, charcoal, activated carbon or other inert powders. As a wettable powder, the compound of this invention may be applied to easily wettable carrier materials, such as attaclay, with or without the aid of surfactants, or on less readily wettable carriers in combination with suitable surfactants.

In use, the compound of this invention may be applied to the insects in effective amounts or in an amount toxic to the insect, the term applied being intended to include applications to their habitats or to organic matter, living or dead, such as plant life, wool, paper or wood, which forms the feed of the insect. As will be seen more fully hereinafter, application of the compound in this invention to larvae, as for example mosquito larvae, in their natural breeding grounds, or the application to feed of chewing insects has been demonstrated to be a highly effective way of controlling insects, whether in the larvae or in the adult stage.

With respect to the control of mosquitoes, extensive programs employing numerous types and kinds of compositions have been initiated to control them, both in the larval and adult stages. Among the most successful methods of control yet discovered is the method of spraying the breeding grounds with materials capable of preventing mosquito larvae from maturing to adulthood. Presently available compositions used for this purpose have not been entirely satisfactory, since many of them are toxic to birds, fish and mamals which inhabit the breeding areas that are treated. Under these circumstances, extreme care must be taken when applying such compositions in order to avoid application of dosages harmful to other inhabitants of the area.

In this connection, the compound of this invention is unique, for while it is extremely toxic to mosquito larvae in low concentrations, it is substantially non-toxic to fish, birds and mammals at concentrations many thousands of times that of the larvicidal dose.

As noted, the compound of this invention is a highly effective insecticide when used against insects which consume vegetation or other organic materials to which such a compound is applied. Such insects damage and consume enormous quantities of food annually. Typically, such insects include the following: cabbage worm, army worm, grasshopper, Mexican bean beetle, Colorado potato beetle, European corn borer and cankerworm. In competing with man for food supply the growing or larval stage is, as a general rule, as destructive as the adult stage. In some groups, such as the Lepidoptera, the larva is the only form that does economic damage. In other species, only the adult stage is accountable for damage produced and in still others both the larval and adult stages are responsible. The compound of this invention has the advantage of being highly effective against both stages of insect life.

The compound of this invention has the further advantage that it may be combined with other insecticides which kill by contact action. Contact insecticides are effective primarily against insects which suck plant juices without consuming the entire tissue. The combination of two types of insecticides primarily effective against insects having different feeding modes would provide insecticidal compositions effective for all types of insects. Thus, by way of example, the insecticide of this invention may be combined with O,O-dimethyl S-(1,2-dicarbethoxyethyl) phosphorodithioate, 1-naphthyl N-methylcarbamate, pyrethrin—mixed esters of pyrethrolone and cinerolone keto-alcohols and two chrysanthemum acids, allethrin, and O,O-dimethyl S(N - methylcarbamoyl)methyl phosphorodithioate.

In order that the present invention may be more fully understood, the following examples are given primarily by way of illustration. No specific details or enumerations contained therein should be construed as limitations on the present invention, except insofar as they appear in the appended claim. All parts and percentages are by weight unless otherwise specifically designated.

EXAMPLE 1

A. (*Non-aqueous*) *O,O,O′,O′-tetramethyl O,O′-thiodi-p-phenylene phosphorothioate*

This compound is prepared by reacting 11 grams (0.05 mole) of 4,4′-thiodiphenol and 5.5 grams (0.1 mole) of sodium methoxide slurried in 400 ml. of methyl ethyl ketone and refluxing for 15 minutes, distilling to remove methanol, diluting with 100 ml. of methyl ethyl ketone and adding 16.2 grams (0.11 mole) of O,O-dimethylphosphorochloridothioate dissolved in 50 ml. of methyl ethyl ketone over 5 minutes under reflux. The mixture is then refluxed for 1.5 hours.

The solids are filtered and the solvent removed in vacuo. The residue is dissolved in chloroform and the solution washed with 5% sodium hydroxide 5% hydrochloric acid, water and saturated sodium chloride solution. The washed solution is then dried and concentrated in vacuo to give 18.3 grams of oil.

Purification by washing with hexane and chromatography on acid-washed alumina gives pure material $n_D^{25} = 1.5880$.

B. (*Aqueous*) *O,O,O′,O′-tetramethyl O,O′-diodi-p-phenylene phosphorothioate*

4,4′-dihydroxy diphenyl sulfide (12.4 grams) is dissolved in 57 grams of 10% aqueous sodium hydroxide and the pH adjusted to 10–11. To this is added 36 grams of O,O-dimethylphosphorochloridothioate with stirring and the temperature held at about 40° C., with external cooling as required, for about 4 hours. Additional 25% aqueous sodium hydroxide is added as required to maintain the initial pH. The reaction mixture is extracted with toluene, and toluene solution dried. After distillation of the solvent, the product is obtained as 24 grams (91% yield) of a viscous oil, $n_D^{25} = 1.5883$.

In order to demonstrate the outstanding properties of the compound of this invention prepared in accordance with Example 1, the following closely related homologues and analogues were prepared in the following manner.

EXAMPLE 2

*O,O,O′,O′-tetraethyl O,O′-thiodi-p-phenylene phosphorothioate*

This compound is prepared by reacting 0.1 mole of O,O-diethylphosphorochloridothioate, 0.05 mole of 4,4′-thiodiphenol and 0.1 mole of potassium tert.-butoxide in a total of 100 ml. of tert.-butanol. The reflux period is 5 minutes. Chromatographic purification yields 82% of theory of analytically pure material as a viscous, colorless liquid with $n_D^{25} = 1.5610$.

EXAMPLE 3

*O,O,O′,O′-tetramethyl O,O′-sulfonyldi-p-phenylene phosphorothioate*

The above-named compound is prepared by the following reaction in which 75 grams of 4,4′-sulfonyldiphenol was slurried in 300 ml. H$_2$O. A solution of sodium hydroxide, containing 1 equivalent of base in each 100 ml. of solution, is prepared and 200 ml. of this solution is added to dissolve the phenol. Then 144 grams (0.9 mole) of O,O-dimethylphosphorochloridothioate is added to the mixture over a period of 1.5 hours. The sodium hydroxide solution is added slowly to maintain a pH of 10.9–11.0. The mixture is heated to 40° to complete the reaction and to hydrolyze the excess O,O-dimethylphosphorochloridothioate.

The product is filtered and dissolved in 300 ml. benzene which was washed with 100 ml. of 5% sodium hydroxide, 100 ml. of water and 100 ml. of saturated sodium chloride. The organic layer is dried with anhydrous magnesium sulfate and the solvent removed in vacuo. The residue is then crystallized from 200 ml. 2B ethyl alcohol. A total of 111.5 grams is obtained, melting point 66–68°.

EXAMPLE 4

*O,O,O′,O′-tetraethyl O,O′-sulfonyldi-p-phenylene phosphorothioate*

In this example, 10 grams of 4,4′-sulfonyldiphenol is slurried in 50 ml. of water and 20 ml. of 4-molar sodium hydroxide solution is added to dissolve the phenol. Then 22.7 grams of O,O-diethylphosphorochloridothioate is added to the mixture. A pH of 10.5–11.0 is maintained by adding more sodium hydroxide solution as required, maintaining the temperature at 50° C.

The mixture is extracted with chloroform and the extract is washed with 5% sodium hydroxide, 5% hydrochloric acid and saturated sodium chloride. The extract is dried and evaporated in vacuo to give 15.6 grams of the product as an oil.

The pure compound has $n_D^{25} = 1.5524$.

TESTING PROCEDURE AGAINST VARIOUS INSECTS

Mosquito Larvae (*Anopheles quadrimaculatus*)

Groups of 25 larvae are transferred by a medicine dropper to 50 ml. beakers containing 25 ml. of water. To 400 ml. glass beakers, 225 ml. of water are added. Concentrations of the test compound are prepared by placing 100 mg. of the compound in 100 ml. of acetone (Solution A). 2.5 ml. of Solution A per 100 ml. of acetone is equal to 25 p.p.m. (Solution B). 1.0 ml. of Solution B is pipetted under the surface of the 225 ml. of water and stirred vigorously. The mosquito larvae are added by tipping the contents of the 50 ml. beaker into the 225 ml. Final concentration is 0.1 p.p.m. The beakers are held at 80° F., and after 24 hours mortality counts are made. If compounds produce 75% or more mortality, serial dilutions are made until the activity is nil.

Mexican bean beetle (*Epilachna varivestis*)

Compounds to be tested are made up as 0.1% solutions in 65% acetone–35% water. Sieva lima bean leaves are dipped in the test solution and set in the hood to dry. When dry, they are placed in four-inch, petri dishes which have a moist filter paper in the bottom and ten, third-instar, bean beetle larvae are added to each dish. The dishes are covered and held at 80° F., 60% relative humidity. After three days, mortality counts and estimates of the amount of feeding are made. Compounds producing kills greater than 75% are further tested at ten-fold dilutions in 65% acetone–35% water.

Southern armyworm (*Prodenia eridania*)

Compounds to be tested are made up as 0.1% solutions. Sieva lima bean leaves are dipped in the test solution and set in the hood to dry. When dry, they are placed in four-inch, petri dishes which have a moist filter paper in the bottom, and ten, third-instar, armyworm larvae about ⅜″ long are added to each dish. The dishes are covered and held at 80°F., 60% relative humidity. After two days, mortality counts and estimates of the amount of feeding are made. Compounds producing kills greater than 50% are further tested at ten-fold dilutions in 65% acetone–35% water.

Nasturtium aphids (*Aphis rumicis*)

The compounds to be tested are made up as 0.1% solutions in 65% acetone–35% water. Three-inch pots containing a nasturtium plant, two inches tall and infested two days before, are selected for testing. The pots are placed on a turntable (4 r.p.m.) and sprayed for two revolutions with a #154 DeVilbiss atomizer at 20 p.s.i. air pressure. The spray tip is held about six inches from the plants and the spray is directed so as to give complete coverage of the aphids and the plants. The sprayed plants are laid on their side on white-enamel trays which have had the edges coated with #50 S.A.E. oil as a barrier. Mortality estimates are made after holding for two days at 70° F., 50% relative humidity, and compounds producing kills greater than 75% are further tested at ten-fold dilutions in 65% acetone–35% water.

Two-spotted spider mite (*Tetranychus telarius*)

Compounds to be tested are made up as 0.1% solutions in 65% acetone–35% water. Sieva lima bean plants with the first pair of leaves three to four inches in size are infested about five hours before testing, using about 100 adult mites per leaf. The infested leaves are dipped in the test solutions (in four-inch, crystallizing dishes) for three seconds, and the plants set in the hood to dry. The treated plants are held for two days at 80° F., 60% relative humidity, and the adult mite mortality calculated by counting dead and alive adults on one leaf under the 10× binocularscope. The other leaf is held an additional five days and then is examined at 10× power to estimate the kill of eggs and newly hatched nymphs, giving a measure of ovocidal and residual action, respectively. Compounds producing kills greater than 85% are further tested at ten-fold dilutions in 65% acetone–35% water.

Confused flour beetle (*Tribolium confusum*)

Compounds to be tested are made up as 1.0% dusts by mixing 0.1 gram of compound with 9.9 grams of Pyrax ABB talc, wetting with 5 ml. of acetone and grinding in a mortar and pestle until dry. 125 mg. of this 1% dust is then blown into the top of a dust settling tower with a short blast of air at 20 p.s.i. The dust is allowed to settle on 4-inch, petri dishes for two minutes. The dishes are removed and 25-adult, confused flour beetles are added immediately. The dishes are held for three days at 80° F., 60% relative humidity, following which, mortality counts are made.

Large milkweed bug (*Oncopeltus fasciatus*)

The 1% dusts described above are used in this test. 25 mg. of the 1% dust is sprinkled evenly over the bottom of a 7-inch, crystallizing dish using a screen-bottom, plastic cup about ⅝″ in diameter as an applicator. Twenty adult bugs are added and a screen cover put on the dish. Water is supplied in 2-ounce bottles with a cotton wick. Mortality counts are made after holding for three days at 80° F., 60% relative humidity.

The results of the tests reported above were as follows.

TABLE I.—TESTING RESULTS OF THE BIS-PHENYL PHOSPHATES

| Example | Structure | Armyworms | | | Aphids | | | | Mites | | TC[1] | MB[2] | Anopheles Mosquito Larvae | | Mexican Bean Beetle Larvae | | Anopheles Mosquito Larvae |
|---|---|---|---|---|---|---|---|---|---|---|---|---|---|---|---|---|---|
| | | .1% | .01 | .001 | .1% | .01 | .001 | .0001 | .1% | .01 | 1% | 1% | ppm .1 | ppm .01 | % .1 | % .01 | LC-50 ppm |
| 1 | $[(CH_3O)_2\overset{S}{\overset{\|}{P}}-O-\langle\bigcirc\rangle]_2 S$ | 100 | 100 | 0 | 100 | 100 | 75 | 10 | 91 | 51 | 100 | 95 | 100 | 98–100 | 100 | 100 | .003 |
| 2 | $[(C_2H_5O)_2\overset{S}{\overset{\|}{P}}-O-\langle\bigcirc\rangle]_2 S$ | 100 | 80 | 0 | 0 | 0 | | | 0 | | 0 | 60 | 100 | 10 | 90 | 0 | .023 |
| 3 | $[(CH_3O)_2\overset{S}{\overset{\|}{P}}-O-\langle\bigcirc\rangle]_2 SO_2$ | 100 | 100 | 0 | 85 | 8 | | | 27 | 0 | 11 | 78 | 100 | 63 | 100 | 100 | .015 |
| 4 | $[(C_2H_5O)_2\overset{S}{\overset{\|}{P}}-O-\langle\bigcirc\rangle]_2 SO_2$ | 100 | 100 | 0 | 10 | | | | 86 | 0 | 10 | 10 | 100 | 14 | 100 | 90 | .022 |

[1] Confused flour beetle    [2] Large milkweed bug

Table I hereinabove demonstrates that the compound of Example 1 has outstanding utility when compared with closely related homologous and analogous compounds against a wide variety of pests, and in particular demonstrates outstanding properties with respect to mites, confused flour beetle, and against the anopheles mosquito larvae. In the test against the anopheles mosquito larvae, the LC-50 (lethal concentration required to kill 50% of the population) a measure of the toxicity of the compound, demonstrates the remarkably high order of toxicity for the compound of Example 1 when compared with closely related thio- and sulfonyl bisphenyl compounds.

*Field testing of the compound O,O,O',O'-tetramethyl O,O'-thiodi-p-phenylene phosphorothioate*

The compound of this invention was field tested. The method of evaluation was as follows:

The plots were 3-feet square and 1-foot deep pools lined with black polyethylene plastic and filled to a depth of ½ foot with water. To promote optimal conditions for the maintenance of *Aedes sollicitans* larvae, a 1½-foot square sod chunk of salt marsh meadow grass (*Spartina patens*) was placed in each plot. The plots were seeded with the eggs of *Aedes sollicitans* whereas *Culex pipiens* eggs were laid naturally. Each plot was covered with a screen to prevent the introduction of predatory insects such as dragonflies.

An emulsifiable concentrate formulation of O,O,O',O'-tetramethyl O,O'-thiodi - p - phenylene phosphorothioate was diluted with fuel oil and applied over the surface of the water with a hand sprayer. The materials were applied at rates ranging from 0.001 to 0.05 pound of actual toxicant per acre. The volume of spray was 0.5 ml. per plot (equivalent to 2 quarts per acre).

The material was evaluated on the basis of the percent decrease in larval population 24 hours after treatment as compared to the pre-treatment population.

The results of this testing appear in Table II hereinbelow.

TABLE II

| Compound | Rate, lbs./acre | Percent Decrease in Population | |
|---|---|---|---|
| | | *Aedes sollicitans* [1] | *Culex pipiens* [2] |
| Example 1 | .025 | 100 | 100 |
| | .01 | 100 | 100 |
| | .005 | 100 | 100 |
| | .001 | 55.8 | 1.76 |

[1] Second and third instars.
[2] All instars.

Table II demonstrates that the compound of this invention is completely effective against these common species, at a phenomenally low rate of .005 pound per acre. This becomes more meaningful when compared with the application rates of a number of important commercial mosquito larvicides which are set forth in Table III below.

TABLE III

| Compound | Dosage |
|---|---|
| 1,1,1-trichloro-2,2-bis(p-chlorophenyl)ethane (DDT). | 0.05 to 0.4 lb. active ingredient per acre. |
| O,O-diethyl o-p-nitrophenyl phosphorothioate (Parathion). | 0.06 lb. active ingredient per acre. |
| 5,6,7,8,9,9-hexachloro-2,3-epoxy-1,2,3,4,4a,5,8,8a-octahydro 1,4,5,8-dimethanonaphthalene (Dieldrin). | 0.05 to 0.1 lb. active ingredient per acre. |
| 1,2,3,4,5,6-hexachlorocyclohexane (Lindane). | 0.1 to 0.15 lb. active ingredient per acre. |
| O,O-dimethyl-O-(3-methyl-4-methylthiophenyl)phosphorothioate (Baytex). | 0.05 to 0.2 lb. active ingredient per acre. |
| O,O-dimethyl-S-(1,2-dicarbethoxyethyl)dithiophosphate (Malathion). | 0.5 lb. active ingredient per acre. |

Note.—The above information obtained from "Insecticide Recommendation," Agricultural Handbook No. 120, Agricultural Research Service and Federal Extension Service of the United States Department of Agriculture.

It will be seen by comparing Tables II and III that the compound of this invention is at least ten times more effective than the most effective of the above important mosquito larvicides.

The toxicity of the compounds of Examples 1 and 3 against various species of mosquito larvae was then tested for. The results of this study are reported in Table IV hereinbelow.

TABLE IV

| Species of Mosquito Larvae | Strain [1] | Reported LC$_{50}$ in p.p.m. | |
|---|---|---|---|
| | | Example 3 | Example 1 |
| *Aedes aegypti* | S | 0.0030 | 0.0012 |
| *Aedes nigromaculis* | S | 0.0044 | 0.0008 |
| *Culex pipiens* | S | 0.005 | 0.0015 |
| *Culex quinquefasciatus* | S | 0.0027 | 0.00053 |
| *Culex tarsalis* | S | 0.0047 | 0.0004 |

[1] S=susceptible.

Table IV demonstrates that the compound of this invention, namely that of Example 1, has a superior toxicity against a large number of species of mosquito larvae when compared with a structurally related sulfonyl bis phenyl compound.

We claim:

O,O,O',O',-tetramethyl O,O'-thiodi-p-phenylene phosphorothioate.

References Cited by the Examiner

UNITED STATES PATENTS 3,153,663  10/1964  Sirrenberg et al. _____ 260—929

CHARLES B, PARKER, *Primary Examiner.*

A. H. SUTTO, *Assistant Examiner.*